Figure 1:
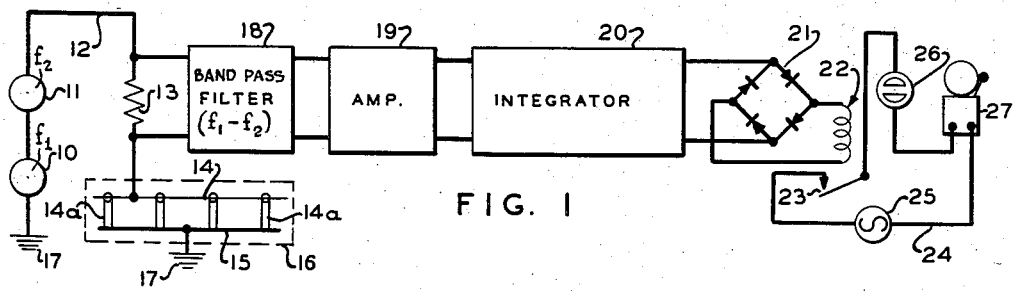

June 26, 1962  J. J. DIETZ  3,041,589
MODULATION TYPE FLAME DETECTING SYSTEM
Filed July 31, 1958  2 Sheets-Sheet 1

INVENTOR.
JOHN J. DIETZ
BY
George H. Fritzinger
AGENT

INVENTOR.
JOHN J. DIETZ
BY
George H. Fritzinger
AGENT

# United States Patent Office 3,041,589
Patented June 26, 1962

3,041,589
MODULATION TYPE FLAME DETECTING SYSTEM
John J. Dietz, New Milford, N.J., assignor to McGraw-Edison Company, Elgin, Ill., a corporation of Delaware
Filed July 31, 1958, Ser. No. 752,258
3 Claims. (Cl. 340—228)

This invention relates to a new and improved fire detecting system wherein the non-linear conducting properties of a flame are utilized to modulate one frequency source by another to produce modulation components for operating an alarm, control or other receiving apparatus.

It is well known that when a variable voltage is applied across two spaced conductors in the atmosphere and the conductors are bridged by a flame, a current will flow in non-linear relation to the applied voltage. The voltage-current relationship can be expressed as a power series but to a first order of approximation non-linear terms higher than the square term need not be considered. Heretofore, the non-linear and/or rectifying properties of flames have been utilized for fire detecting purposes by applying a voltage source of fundamental frequency across two spaced metal conductors or sensing elements in the region to be monitored and providing a receiving apparatus tuned to respond to the second harmonic of the voltage source created in the circuit by the presence of a flame across the sensing elements. This type of flame detecting apparatus requires a well-nigh pure source of fundamental frequency, especially one free of second harmonics, in order that there will be obtained a sufficiently high ratio of created second harmonic signal to noise in the output. Also, there is the disadvantage that the second harmonic output is typically of such low level that there is required a very large amplification to operate the usual receiving apparatus. Furthermore, these prior systems have required a high impedance insulation between the sensing elements of the order of hundreds of thousands of ohms, which is difficult to maintain in practice, especially when detecting engine oil fires on aircraft, because of accumulation of oil, dirt, elements of the weather, and so forth.

The present fire detecting system is carried out preferably by connecting two sources of A.C. voltage of different frequencies in series across the sensing elements to be bridged by flame, and by providing a receiving apparatus tuned to the difference frequency between the two voltage sources which appears in the output when the sensing elements are bridged by a flame. The present system has a first advantage in that the frequency sources need not be free of harmonics. This permits the use of simple inexpensive oscillators and eliminates the need for filters at the source. Secondly, the output signal, which is a modulation component dependent on the product of the two input voltages, has a relatively high level of magnitude requiring much less amplification than that needed in prior systems. Because of this higher level output the insulation requirements between the sensing elements is greatly reduced. This means that the system is much less apt to ever produce any false alarms because of accumulation of dirt, oil or elements of the weather such as might reduce the insulation between the sensing elements. These features provide for a more reliable detection of fires than has been heretofore feasible.

Objects of my invention are to provide a new and improved apparatus for detecting flames which is more reliable, easier to maintain and more economical to produce than are the prior detecting systems.

These and other objects and features of my invention will be apparent from the following description and the appended claims.

Figure 2:
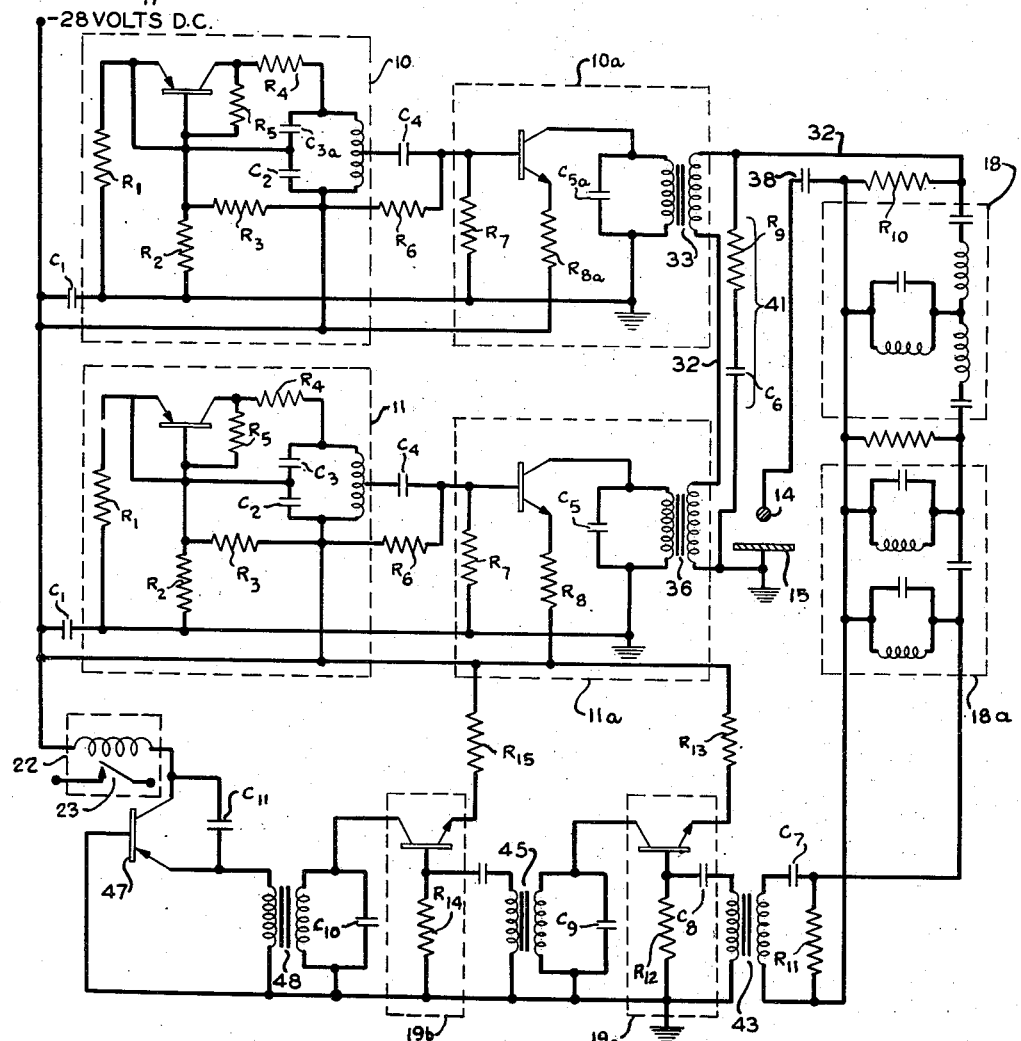
Figure 3:
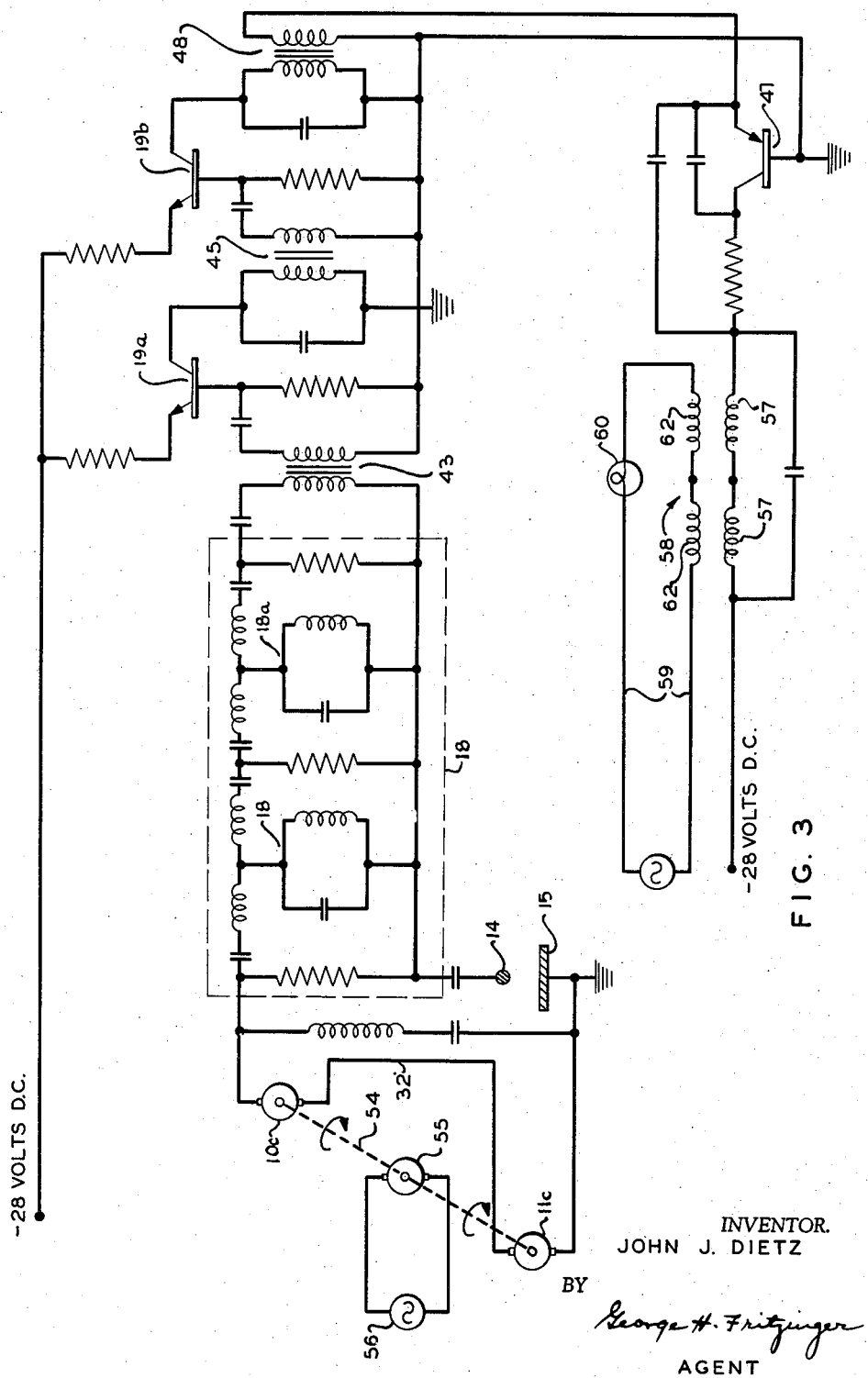

In the description of my invention reference is had to the accompanying drawings, of which:

FIGURE 1 is a schematic diagram of a flame-contact fire detecting system according to my invention;
FIGURE 2 is an illustrative schematic circuit diagram of one form of the present fire detecting system; and
FIGURE 3 is a schematic diagram showing a modified form of the invention.

As shown in FIGURE 1 the present system comprises two A.C. sources 10 and 11 of different frequencies connected serially in a circuit 12 including a load resistor 13 and two spaced sensing elements 14 and 15 provided in a region 16 to be monitored. Typically, in detecting engine oil fires on aircraft the sensing means comprises a single bare wire 14 as of stainless steel mounted on standoff insulators 14a on the nacelle structure of the airplane represented in the drawings by the element 15. The circuit is then completed through the frame of the plane designated by the grounds 17.

When the sensing elements are not bridged by a flame the circuit 12 is open and no voltage is developed across the load resistor 13. However, if a flame bridges the sensing elements the ionized state of the gas between the sensing elements causes a current to flow. Because of the non-linear conducting properties of the flame, which is accentuated when the flame bridges spaced conductors having different surface areas of contacts with the flame, as is here the case, the current flowing in the circuit 12 is of a form which can be represented by a power series including a D.C. component and a series of A.C. components which are functions respectively of successively higher powers of the applied voltages. Of the non-linear components, only the square term need be herein considered. As is well known, a function which is a square of the sum of voltages of different frequencies gives rise to new A.C. components having a magnitude dependent on the product of these voltages and intermodulation frequencies equal respectively to the sum and difference of the frequencies of the applied voltages. Thus, if we designate the magnitude and frequency of the voltage source 10 as $E_1$ and $f_1$ and those of the voltage source 11 as $E_2$ and $f_2$ there will appear modulation components each having a magnitude proportional to $E_1E_2$, and respective frequencies of $(f_1-f_2)$ and $(f_1+f_2)$. Preferably, the difference or beat frequency $(f_1-f_2)$ is utilized for operating a receiving apparatus connected across the load resistor 13 and tuned to this frequency. Such apparatus may comprise a band-pass filter 18 having a narrow pass band including the difference frequency and excluding the other frequencies, and an amplifier 19 which may also be tuned to the difference frequency in order to achieve maximum discrimination in picking up the difference frequency and excluding all other components. However, any receiving apparatus having the desired selectivity whether simply a tuned amplifier or an amplifier with a filter as shown, may be employed. The receiving apparatus may further include any suitable integrating or rate counting device known in the art. This device is set to pass only signals having a continuity or regularity for a predetermined duration as of about .5 second, the purpose of which is to prevent the receiving apparatus from possibly responding to random signals or transients such as may be caused by rain, lightning, transient shorts, etc. Connected to the output of the integrating device 20 is a full wave rectifier 21 and connected to the output of this rectifier is the coil of a relay 22 having contacts 23 connected in a power circuit 24 to be controlled. Such circuit may include a power source 25 of either A.C. or D.C. current, and both visual and audio alarms such as a lamp 26 and a bell 27.

It is important that the frequencies $f_1$ and $f_2$ of the two voltage sources be chosen so that their sum and difference values are not harmonically related to—i.e., not integral multiples of—the fundamental frequencies of the two sources. When this condition is realized the wave shapes of the voltage sources need not be sinusoidal in order to provide the needed ratio of desirable beat frequency to unwanted signal because all harmonic frequencies of the applied voltages as well as all other significant intermodulation frequencies of the applied voltages will be substantially spaced from the desired difference frequency $(f_1-f_2)$ in the output circuit.

It is found, for example, that upon using applied voltages $E_1$ and $E_2$ of five volts each and of fundamental frequencies of 4.5 kc. and 3.5 kc., a filter 18 having a pass band from 900 to 1100 c.p.s. with a 45 db attenuation at 500 c.p.s. from the cut off frequencies of the filter, and an amplifier 19 having of the order of 45 db gain, there is obtained a 40 to 1 ratio of output signal to noise when the sensing elements are bridged by a flame. Even when the sensing elements are shunted by a resistance as low as 2700 ohms, the desired signal to noise ratio in the output is still of the order of 18 to 1 to provide a very positive and dependable operation of the alarm equipment. The fact that there need not be maintained the usual high impedance between the sensing elements means in practice that maintenance requirements are much less severe and that operation of the equipment is more dependable.

In FIGURE 2 there is shown a schematic circuit diagram illustrating in detail a satisfactory circuit arrangement for carrying out the present invention. Approximate values of the resistors, condensers and inductors of this circuit are designated respectively in kilo-ohms and microfarads in the following list:

| Resistance Values | | Condenser Values | |
|---|---|---|---|
| $R_1$ | 4.3 | $C_1$ | 25 |
| $R_2$ | .47 | $C_2$ | .1 |
| $R_3$ | 33 | $C_3$ | .021 |
| $R_4$ | 12 | $C_{3a}$ | .022 |
| $R_5$ | 56 | $C_4$ | .03 |
| $R_6$ | 12 | $C_5$ | .01 |
| $R_7$ | 56 | $C_{5a}$ | .033 |
| $R_8$ | .56 | $C_6$ | .02 |
| $R_{8a}$ | .20 | $C_7$ | .56 |
| $R_9$ | 1.1 | $C_8$ | .15 |
| $R_{10}$ | 10 | $C_9$ | .14 |
| $R_{11}$ | 10 | $C_{10}$ | .042 |
| $R_{12}$ | 1000 | $C_{11}$ | .56 |
| $R_{13}$ | .050 | | |
| $R_{14}$ | 56 | | |
| $R_{15}$ | .47 | | |

With reference to the groups of circuit elements enclosed by the dotted lines, there is a transistor oscillator 10 tuned to 3.5 kilocycles and feeding into a transistor amplifier stage 10a which is coupled to a detector circuit 32 through a transformer 33 having a 1 to 3 step-up in turns ratio and a primary winding tuned to the frequency of the oscillator. A second transistor oscillator 11 is tuned to 4.5 kilocycles and feeds into a second transistor amplifier stage 11a which is coupled also to the detector 32 through an output transformer 36 having a 1 to 3 step-up ratio in turns and having its primary winding tuned to the frequency of the respective oscillator. The detector circuit 32 serially includes the secondary windings of the output transformers 33 and 36, a load resistor $R_{10}$, an isolating condenser 38 and a pair of spaced conductors or sensing elements 14 and 15 of which the element 14 represents a stainless steel wire mounted insulatedly on and in close proximity to a ground plate 15 representing for instance the nacelle of an airplane. Connected in the detector circuit in parallel with the elements $R_{10-14-15}$ is a series resonant circuit 41 tuned to 1000 cycles per second, the difference frequency of the two oscillators.

When a flame bridges the sensing elements, modulation components appear in the detecting circuit 32 of which the difference-frequency component is emphasized by the tuned resonant circuit 41. The output circuit leading from across the load resistor $R_{10}$ also includes band pass filters to emphasize further the difference frequency component and to exclude all other components. For instance, there is in the output circuit T and pi types of band pass filters 18 and 18a in series, each having nominal cut-off frequencies at 850 and 1150 c.p.s. These are filters having relatively sharp cut-off characteristics to provide of the order of 100 db attenuation at frequencies 500 c.p.s. below and above 1000 c.p.s.—the medial pass band frequency of the filters.

The output of the filter 18a is coupled through a transformer 43 to a transistor amplifier stage 19a, which is in turn coupled by an interstage transformer 45 to another transistor amplifier stage 19b. These transistor amplifier stages are operated class A. A third and last transistor stage 47 is coupled to the stage 19b through an interstage transformer 46. To emphasize further the pass band frequency the primary windings of the interstage transformers 45 and 48 are tuned to 1000 c.p.s., the difference frequency. The last transistor stage 47 is operated class B so that it will serve both as an amplifier and rectifier. The rectified pulses of this stage are filtered by a shunt condenser $C_{11}$ to provide an output which is essentially a steady D.C. voltage when the sensing elements 14 and 15 are bridged by a flame. This D.C. voltage is fed through the coil of a relay 22 which typically has such sensitivity that it will close its contacts 23 in response to about 40 milliwatts of power fed through the coil. The contacts 23 are connected in any suitable circuit not shown for operating an alarm to indicate when the sensing elements are bridged by a flame.

In the modified form of the invention shown in FIGURE 3, the oscillation sources are in the form of respective generators 10c and 11c driven through a common shaft 54 by a synchronous motor 55. This motor may be of a type operable from a 115 volt, 400 cycle source 56 such as is commonly provided on aircraft. The generators 10c and 11c are arranged to have output voltages of different frequencies. For example, these frequencies may be 3600 c.p.s. and 2800 c.p.s. respectively giving a difference frequency of 800 c.p.s. The detection circuit 32, filters 18 and 18a, tuned amplifier stages 19a—45 and 19b—48 are the same as in the previous embodiment except for being tuned now to the difference frequency of 800 c.p.s. Also, as before, there is used the output transistor stage 47 operated class B to function both as an amplifier and a rectifier. However, the output stage now feeds into the control windings 57 of a magnetic amplifier 58 connected in a power circuit 59 through a signal light or other alarm device 60.

When there is no output signal from the output stage 47—which is the condition when there is no flame bridging the sensing elements 14 and 15—the cores 61 of the magnetic amplifier are unsaturated, with the result that the controlled windings 62 of the magnetic amplifier have then a high inductive reactance to prevent flow of any substantial current in the power circuit 59. However, when a flame bridges the sensing elements 14 and 15 to cause a D.C. current to flow from the output stage 47 through the control windings 57 the cores 61 become saturated and the controlled windings 62 present only their ohmic resistance in the power circuit 59, with the result that a relatively high current now flows in this circuit to operate the alarm device. Since a magnetic amplifier will operate from a lower control current than will a D.C. relay as shown in FIGURE 2, the magnetic amplifier provides a more sensitive fire detection system.

The embodiments of my invention herein particularly

I claim:

1. A flame detecting apparatus comprising a detecting circuit including two oscillation sources of different fundamental frequencies whose difference frequency is in non-harmonic relation to said fundamental frequencies, two spaced conductor elements disposed in a region to be monitored for presence of flame, means connecting said conductor elements serially in said detecting circuit to cause the circuit to have a non-linear conductance characteristic giving rise to modulation components in said circuit when said conductor elements are bridged by a flame, and a receiving means connected to said detecting circuit and tuned to the frequency of a predetermined one of said modulation components.

2. The flame detecting apparatus set forth in claim 1 wherein said oscillation sources comprise two electric oscillation generators in fixed driven relationship, and a common motor for driving said generators.

3. The flame detecting apparatus set forth in claim 1 wherein said receiving means includes a rectifying means for providing a D.C. output voltage when said conductor elements are bridged by a flame, a magnetic amplifier having a control winding connected to said D.C. output voltage, and an alarm device connected in the output circuit of said magnetic amplifier.

References Cited in the file of this patent

UNITED STATES PATENTS

| | | |
|---|---|---|
| 2,737,643 | Marsden | Mar. 6, 1956 |
| 2,929,989 | Hurvitz | Mar. 22, 1960 |

OTHER REFERENCES

Audio Engineering, October 1948, pages 17, 18 and 55.
Audio Engineering, November 1950, pages 24, 25, 56, 57 and 58.
"An Analysis of the Intermodulation Method of Distortion Measurement" by W. J. Warren et al., Proceedings of the I.R.E., April 1948, pages 457–466.